F. PERDALA.
RESILIENT TIRE.
APPLICATION FILED SEPT. 30, 1919.
1,343,155.
Patented June 8, 1920.
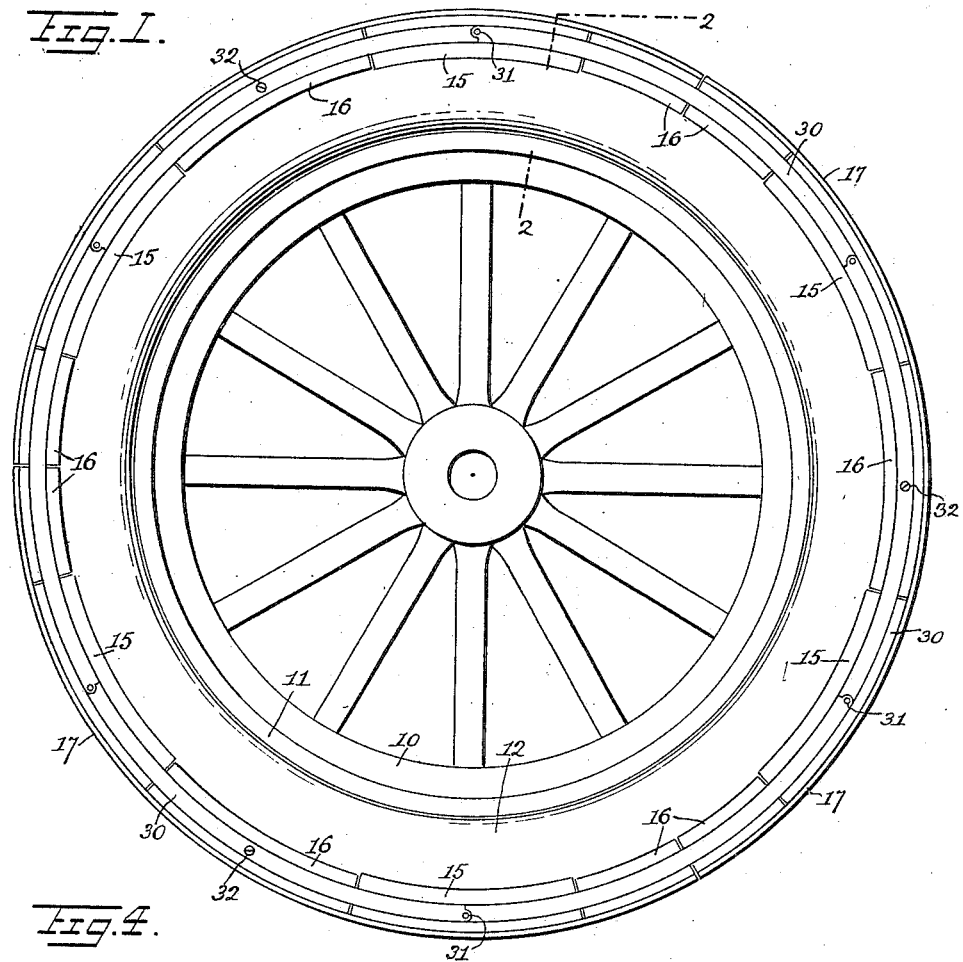
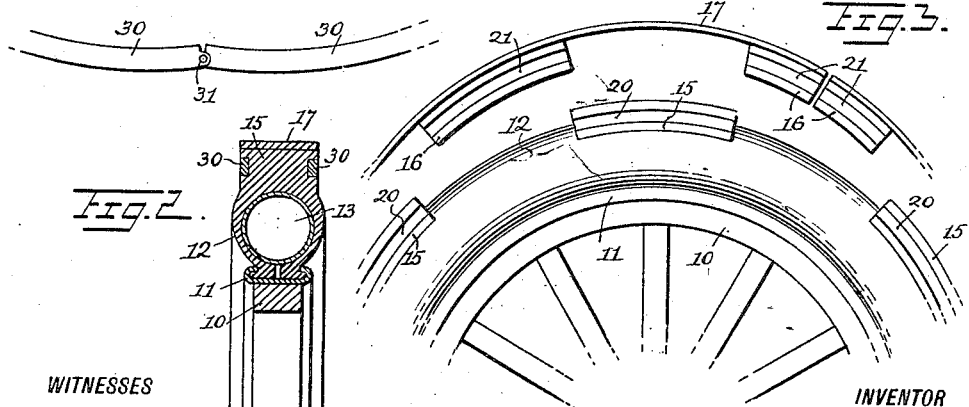
WITNESSES
H. T. Walker
INVENTOR
Fred Perdala
BY Munn & Co
ATTORNEYS

UNITED STATES PATENT OFFICE.

FRED PERDALA, OF NEWARK, NEW JERSEY.

RESILIENT TIRE.

1,343,155. Specification of Letters Patent. Patented June 8, 1920.

Application filed September 30, 1919. Serial No. 327,383.

*To all whom it may concern:*

Be it known that I, FRED PERDALA, a citizen of Austria, and a resident of Newark, in the county of Essex and State of New Jersey, have invented a new and Improved Resilient Tire, of which the following is a full, clear, and exact description.

The invention relates to vehicle tires having a shoe and an inflatable tube therein.

The object of the invention is to provide a new and improved resilient tire for vehicle wheels arranged to produce a desired cushioning effect and to permit of readily removing a worn out tread from the shoe and replacing it by a new one without requiring removal of the shoe from the wheel rim.

Another object is to reduce puncturing of the inner tube to a minimum.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of a vehicle wheel provided with the improved resilient tire;

Fig. 2 is a cross section of the same on the line 2—2 of Fig. 1;

Fig. 3 is a side elevation of a portion of the wheel with a corresponding portion of the tread shown detached; and Fig. 4 is a side elevation of a portion of one of the locking rings and showing more particularly the rule joint connecting the sections of the locking ring with each other.

The felly 10 of the vehicle wheel is provided with the usual rim 11 engaged by the shoe 12 containing the usual inflatable inner tube 13. The shoe 12 is provided at its peripheral face with spaced blocks 15, preferably made of the same material of which the shoe 12 is made, and preferably made integral therewith, as indicated in Fig. 2. Between adjacent blocks 15 fit interlocking blocks 16 attached to the inner face of a tread 17 of metal, rubber or other suitable material. The blocks 16 may be made of rubber or other material of which the shoe 12 and its locking blocks 15 are made. The tread 17 is made in sections, preferably three in number, to permit of readily fitting the interlocking blocks 16 between corresponding blocks 15 of the shoe 12. By the arrangement described, the tread 17 is held against creeping circumferentially on the wheel.

In order to hold the sections of the tread 17 locked in position on the shoe 12 and at the same time to hold the tread against transverse movement, the following arrangement is made: The sides of the blocks 15 and 16 are provided with recesses 20 and 21 circumferentially in register with each other when the tread 17 is in position on the shoe 12, and into the registering recesses 20 and 21 on each side of the wheel fits a locking ring 30, preferably made in sections hingedly connected with each other as shown at 31, plainly shown in Figs. 1 and 4. The rings 30 are preferably fastened in place on the blocks 16 by suitable fastening means such as screws 32, as indicates in Fig. 1.

By reference to Figs. 1 and 3, it will be noticed that one tread block 16 is arranged at the middle of each section of the tread 17 and half blocks are arranged at the ends of each section and consequently the two half blocks of adjacent ends fit into the corresponding adjacent blocks 15. This arrangement facilitates the placing of the tread in position on the shoe.

From the foregoing it will be seen that a desired cushioning effect is provided by the use of the inflatable inner tube 13 and the tread is sufficiently high on the peripheral face of the shoe to prevent puncturing of the same by nails or other extraneous matter.

It will further be noticed that on removing the locking ring 30, the sections of the tread 17 can be readily removed, and, if worn, replaced by new ones and without requiring removal of the shoe 12 and its inner tube 13 from the rim of the vehicle wheel.

Having thus described my invention, I claim as new and desire to secure by Letters Patent:—

1. A resilient tire for vehicle wheels, comprising a shoe provided on its peripheral face with spaced integral blocks, a tread made in sections provided on its inner face with spaced blocks adapted to fit between and interlock with the said blocks of the shoe, the said blocks on the shoe and tread having registering recesses in each side, and a sectional and hinged locking ring fitting into the registering recesses at each side.

2. A resilient tire for vehicles, comprising a shoe provided on its peripheral face with spaced integral blocks, a tread made in sections and provided on its inner face with spaced blocks adapted to fit between the blocks of the shoe, each section having a block intermediate of its ends and a block at each end, the end blocks being one half the length of the other block, the blocks of the shoe and tread having registering grooves in each side, and sectional and hinged rings fitting in the grooves of said blocks.

FRED PERDALA.